United States Patent Office 3,717,035
Patented Feb. 20, 1973

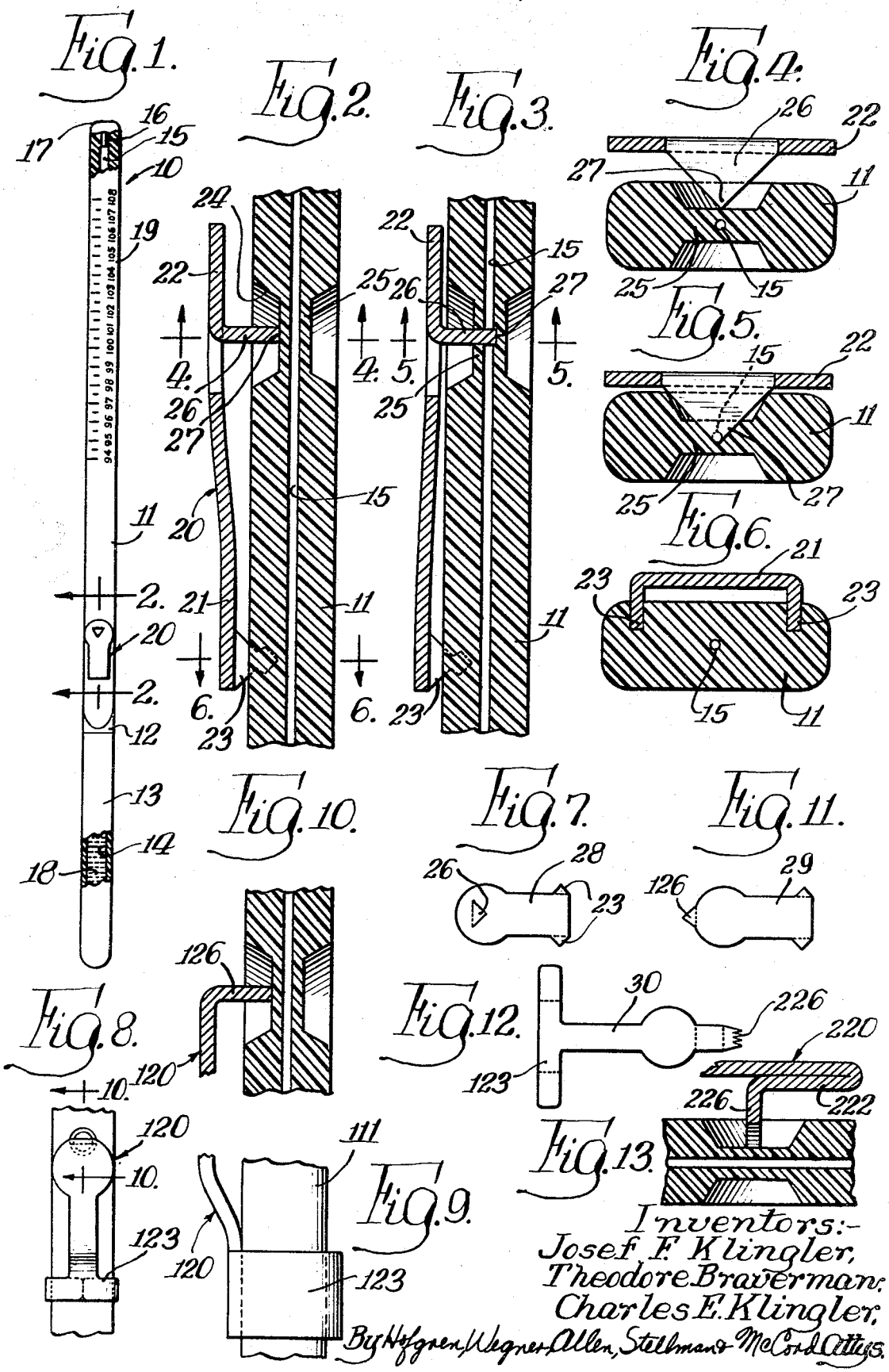

3,717,035
THERMOMETER WITH MEANS FOR SELECTIVELY CLOSING THE CAPILLARY BORE
Josef F. Klingler, Wilmette, Ill., Theodore Braverman, Bayside, N.Y., and Charles E. Klingler, Chicago, Ill., assignors to Thermex Inc.
Filed Feb. 19, 1971, Ser. No. 116,971
Int. Cl. G01k 5/04
U.S. Cl. 73—371
27 Claims

ABSTRACT OF THE DISCLOSURE

A thermometer having an open ended capillary bore and means for selectively closing the bore. The bore closing means may comprise an element arranged to pierce the capillary element and extend across the bore. The bore closing means may be movably carried on the capillary element.

BACKGROUND OF THE INVENTION

Field of the invention

This invention relates to thermometers and in particular to thermometers having an open capillary portion.

Description of the prior art

In the conventional thermometer, the indicator liquid is hermetically sealed within the capillary element under a vacuum pressure. In one improved form of thermometer, the capillary bore is open to atmosphere at the distal end. The indicator liquid in the capillary bore and reservoir chamber defined by the bulb of the thermometer is, therefore, under normal ambient atmospheric pressure.

In a further improved form of such open-to-atmosphere thermometers, the bulb is formed of a material having high thermal conductivity for improved facilitated rapid indication of the temperature being sensed.

SUMMARY OF THE INVENTION

The present invention comprehends such an open-to-atmosphere thermometer including means for selectively closing the capillary bore when desired.

The bore closing means may be movably associated with the capillary element for permitting the user to effect the closing of the bore by a simple facilitated manipulation thereof. The bore closing means may be arranged to close the bore below the level of the indicating scale and, thus, may serve as a means for effectively preventing retraction of the indicator liquid notwithstanding a lowering of the temperature to below the indicated temperature.

The bulb portion of the thermometer may be formed of a material having high thermal conductivity, such as metal, for improved fast indicating of the temperature being sensed. The retraction preventing means may be employed to prevent a corresponding rapid retraction of the indicator liquid as by a heat transfer away from the liquid through the bulb material.

The capillary element may be formed of a pierceable material such as plastic and the bore closing means may be arranged to pierce the capillary element so as to extend across the capillary bore in the bore closing arrangement. The bore closing means may be mounted on the capillary element and have a deflectable portion permitting the selective movement of a bore closing portion thereof.

BRIEF DESCRIPTION OF THE DRAWING

Other features and advantages of the invention will be apparent from the following description taken in connection with the accompanying drawing wherein:

FIG. 1 is a front elevation of a thermometer embodying the invention;
FIG. 2 is a fragmentary enlarged longitudinal section thereof taken substantially along the line 2—2 of FIG. 1;
FIG. 3 is a longitudinal section similar to that of FIG. 2 but with the bore closing means disposed in the bore closing position;
FIG. 4 is a transverse section taken substantially along the line 4—4 of FIG. 2;
FIG. 5 is a transverse section taken substantially along the line 5—5 of FIG. 3;
FIG. 6 is a transverse section taken substantially along the line 6—6 of FIG. 2;
FIG. 7 is a plan view of a bore closing element blank;
FIG. 8 is a fragmentary elevation of a thermometer having a modified form of bore closing element;
FIG. 9 is a fragmentary enlarged side elevation further illustrating the bore closing element of FIG. 8;
FIG. 10 is an enlarged fragmentary longitudinal section taken substantially along the line 10—10 of FIG. 8;
FIG. 11 is a plan view of a further modified bore closing element blank;
FIG. 12 is a plan view of still another modified bore closing element blank; and
FIG. 13 is a fragmentary enlarged diametric section illustrating the arrangement of the bore closing element formed from the blank of FIG. 12.

DESCRIPTION OF THE PREFERRED EMBODIMENTS

In the exemplary embodiment of the invention as disclosed in FIGS. 1–7 of the drawing, a thermometer generally designated 10 is shown to comprise a capillary element 11 having an inner end 12 to which is fixedly secured a bulb 13 defining a reservoir chamber 14. Reservoir chamber 14 communicates with the lower end of a through capillary bore 15 extending longitudinally through the capillary element.

At its outer end, bore 15 defines a restricted distal portion 16 which is open to atmosphere through the tip 17 of the capillary element. A suitable indicator liquid 18 is provided in reservoir chamber 14 and at all normal temperatures, such as down to —40° F., at least a portion of the indicator liquid extends upwardly into the capillary bore 15.

A suitable scale 19 is provided on the capillary element for reading a temperature as a function of the upper level of the indicator liquid in capillary bore 15. Thus, capillary element 11 is formed of a light transmitting material, such as a transparent plastic, for facilitated viewing of the indicator liquid relative to scale 19. The indicator liquid may comprise any suitable liquid and may be colored as with a dye for facilitating the reading thereof. The liquid is maintained within the capillary bore at all normal temperatures such as up to 140° F. by virtue of the extension of the bore to substantially above the upper level of the scale 19 to accommodate a substantial expansion of the indicator liquid as a result of subjection of the thermometer to an abnormally high temperature, i.e., higher than that contemplated in the use of scale 19. The restricted outlet portion 16 of the capillary bore effectively precludes flow of the liquid outwardly from the bore notwitnstanding an inverted position of the thermometer. Thus, while the capillary bore 15 is open to atmosphere at distal end 16, the indicator liquid is effectively maintained therein under all normal conditions.

In the illustrated embodiment, thermometer 10 comprises a clinical thermometer with scale 19 being arranged to indicate temperature readings of between 94° to 108° F. As will be obvious to those skilled in the art, the invention comprehends the arrangement of the thermometer for any suitable temperature range.

Bulb 13 is preferably formed of a material having high thermal conductivity to permit a rapid heat transfer therethrough for quickly providing the desired reading of the sensed temperature. Illustratively, the bulb may be formed of metal.

As discussed briefly above, thermometer 10 further includes means for selectively closing the capillary bore when desired. As shown in FIG. 1, the bore closing means may comprise an element generally designated 20 which may be movably associated with the thermometer for facilitated closing of capillary bore 15. As best seen in FIGS. 2–6, bore closing element 20 may comprise a deflectible element having a support portion 21 secured to the capillary element and a deflectible distal portion 22 movable toward the capillary element as a result of fingertip manipulation thereof. Support portion 21 may be provided with a pair of prongs 23 which may be embedded in the wall of the capillary element for locking the support portion thereto.

The capillary element may be provided with a recess 24 adjacent the distal end 22 of the bore closing means to define a thin section 25 of the capillary element about a portion of bore 15. Distal end 22 of the bore closing means may have a suitable tab 26 struck therefrom and turned at right angles thereto to have a pointed tip 27 engage the capillary element portion 25 at the bottom of recess 24. As seen in FIG. 4, tab 26 may be triangular with tip 27 defining the sharp apex of the triangle.

Tab 26 is adapted to close bore 15 by a piercing of capillary element portion 25 to dispose the tab tip 27 across the capillary bore 15 as shown in FIG. 6.

Thus, in use, thermometer 10 may be employed in the conventional manner of a clinical thermometer by normal insertion of the bulb portion 13 into the patient's body cavity. The indicator liquid quickly expands as the result of the improved thermal transfer efficiency of metal bulb 13. The person taking the patient's temperature may, upon removal of the thermometer from the patient, immediately depress distal portion 22 of bore closing means 20 causing the tab tip 27 to block bore 15 and effectively prevent retraction of the indicator liquid upon subsequent cooling thereof by exposure to the ambient atmosphere. Thus, the temperature reading is positively maintained to provide a permanent record of the temperature permitting the actual reading to be made at any time as desired.

As will be obvious to those skilled in the art, any suitable means for closing the capillary passage is contemplated within the scope of the invention, including means for constricting the capillary element to deform the capillary passage into a closed condition.

Further, as will be obvious to those skilled in the art, modifications of the specific construction of the bore closing means are comprehended within the scope of the invention. Illustratively, as shown in FIG. 8, one modified form of bore closing means generally designated 120 is shown to comprise an element generally similar to element 20 but having means generally designated 123 for encircling the capillary element to retain the bore closing element in association therewith. The encircling means 123 may define a pair of flanges which may be clamped about the capillary element to provide a positive retention of element 120 on capillary element 111 as shown in FIG. 9.

A further modification of the bore closing means may comprise the provision of a turned distal end of bore closing means 120 in lieu of the struck tab 26 of element 20.

In a further modified form of bore closing means generally designated 220 illustrated in FIG. 13, the outer end 222 of the element is folded back and the turned end 226 extends from the distal end of the folded portion 222.

The bore closing means may comprise stamped metal pieces which may be formed from suitable blanks, such as blank 28 illustrated in FIG. 7, blank 29 illustrated in FIG. 11, and blank 30 illustrated in FIG. 12. Blank 28 may be formed to define prongs 23 and struck tab 26, as shown. Blank 29 is similar to blank 28 except that the distal end of the element is extended to define the turned end portion 126 illustrated in FIG. 10.

Blank 30 may include an enlarged transversely extending portion defining encircling means 123 illustrated in FIGS. 8 and 9. As further shown in FIG. 12, the projecting end portion may comprise a toothed end 226 for use in the bore closing means 220 as illustrated in FIG. 13 in lieu of the single pointed end 126 illustrated in FIG. 11. As will be obvious to those skilled in the art, any combination of the different securing means and penetrating means may be employed within the scope of the invention.

For facilitated bore closing operation, the thin portion 25 of the capillary element may have a thickness of the same order of magnitude as the diameter of the bore 15. Illustratively, the bore may have a diameter of approximately .009" were the thickness of bore portion 25 is approximately .01". As discussed above, the bore closing element may be formed of a suitable deflectible material, such as metal, and in the illustrated embodiment is formed of aluminum. The bore closing element may be formed of approximately .015" thick stock material and may have an overall length of approximately $9/16"$ with the turned portion thereof projecting approximately $1/16"$.

The foregoing disclosure of specific embodiments is illustrative of the broad inventive concepts comprehended by the invention.

We claim:

1. A thermometer comprising: a capillary element having scale means and a longitudinal through bore having an inner end and an outer end; a bulb defining a reservoir chamber communicating with the inner end of the capillary bore; indicator liquid in said reservoir chamber and bore for cooperation with said scale means to indicate the temperature thereof; and means movably associated with said capillary element for selectively closing said capillary bore intermediate said ends for effectively positively preventing retraction of the indicator liquid.

2. The thermometer of claim 1 wherein said bore closing means comprises means for closing the bore adjacent said inner end.

3. The thermometer of claim 1 wherein said bore closing means comprises means carried on the exterior of said capillary element.

4. The thermometer of claim 1 wherein said bore closing means comprises closure means selectively disposable across said bore.

5. The thermometer of claim 1 wherein said bore closing element includes support means fixedly secured to said capillary element and means extending from said support means exteriorly of said capillary element for selectively engaging said capillary element to close said bore.

6. The thermometer of claim 1 wherein said capillary element defines a recess having an inner end spaced adjacent said bore and said bore closing means engages said capillary element at said inner end of said recess for closing said bore.

7. The thermometer of claim 1 wherein said bore closing element includes support means secured to said capillary element comprising means inserted through a wall portion of the capillary element to extend across said bore.

8. The thermometer of claim 1 wherein said bore closing element includes support means secured to said capillary element comprising means embracing said capillary element.

9. The thermometer of claim 1 wherein said bore closing element includes support means secured to said capillary element comprising means embracing said capillary element about said inner end of said capillary bore.

10. The thermometer of claim 1 wherein said bore closing element includes barbed means for securing the same to said capillary element.

11. A thermometer comprising: a capillary element having scale means and a longitudinal through bore having an inner end and an outer end; a bulb carried by the capillary element and defining a reservoir chamber communicating with the inner end of the capillary bore; indicator liquid in said reservoir chamber and bore for cooperation with said scale means to indicate the temperature thereof; and means movably associated with said thermometer for selectively closing said capillary bore, said capillary element being pierceable and said bore closing means comprising means for piercing said capillary element to be selectively disposable across said bore.

12. The thermometer of claim 11 wherein said bore closing means comprises a sharp toothed element, and means for manually urging said toothed element into said capillary element.

13. The thermometer of claim 11 wherein said bore closing means includes shoulder means for preventing withdrawal of the bore closing means from the capillary element.

14. The thermometer of claim 11 wherein said capillary element is formed of a synthetic plastic.

15. A thermometer comprising: a capillary element having scale means and a longitudinal through bore having an inner end and an outer end; a bulb defining a reservoir chamber communicating wih the inner end of the capillary bore; indicator liquid in said reservoir chamber and bore for cooperation with said scale means to indicate the temperature thereof; and means movably associated with said thermometer for selectively closing said capillary bore comprising an element having a turned end adapted to pierce said capillary element.

16. The bore closing element of claim 15 wherein said turned end comprises a sharp triangular tip.

17. The bore closing element of claim 15 wherein said turned end comprises a toothed tip.

18. The bore closing element of claim 15 wherein said turned end comprises a first portion folded back to define a double thickness end structure and a distal portion turned from the flatwise extent of said end structure.

19. A thermometer comprising: a capillary element having scale means and a longitudinal through bore having an inner end and an outer end; a bulb carried by the capillary element and defining a reservoir chamber communicating with the inner end of the capillary bore; indicator liquid in said reservoir chamber and bore for cooperation with said scale means to indicate the temperature thereof; and means movably associated with said thermometer for selectively closing said capillary bore, said bore closing element comprising an element having a turned tab upset therefrom and provided with a sharp tip for piercing said capillary element.

20. A thermometer comprising: a capillary element formed of synthetic plastic having scale means and a longitudinal through bore having an inner end and an outer end; a bulb formed of a material having high thermal conductivity and defining a reservoir chamber communicating with the inner end of the capillary bore; indicator liquid in said reservoir chamber and bore for cooperation with said scale means to indicate the temperature thereof; and means movably associated wih said thermometer for effectively permanently blocking said bore for permanently preventing retraction of said liquid in the bore adjacent said scale means notwithstanding a lowering of the temperature to below the indicated temperature.

21. The thermometer of claim 20 wherein said bore outer end is open and remains open notwithstanding the selective disposition of said retraction preventing means to prevent said retraction of the indicator liquid.

22. The thermometer of claim 20 wherein said retraction preventing means is disposed intermediate said scale means and said reservoir chamber.

23. The thermometer of claim 22 wherein said retraction preventing means comprises a one-time use means for permitting only a single temperature indicating use of said thermometer with the liquid retraction being prevented.

24. The thermometer of claim 20 wherein said capillary element is formed of a synthetic plastic.

25. The thermometer of claim 20 wherein said retraction preventing means comprises a sharp piercing element movable through the capillary element to extend across said bore.

26. The thermometer of claim 20 wherein said retraction preventing means is spaced from said bulb.

27. A thermometer comprising: a capillary element having scale means and a longitudinal through bore having an inner end and an outer end; a bulb defining a reservoir chamber communicating with the inner end of the capillary bore; indicator liquid in said reservoir chamber and bore for cooperation with said scale means to indicate the temperature thereof; and means movably associated with said capillary element for selectively closing said capillary bore for effectively positively permanently preventing retraction of the indicator liquid.

References Cited

UNITED STATES PATENTS

| 2,045,693 | 6/1936 | Broder | 73—373 |
| 489,259 | 1/1893 | Maxim et al. | 73—371 X |
| 2,712,237 | 7/1955 | Margolis | 73—371 |
| 2,729,977 | 1/1956 | Juffa | 73—371 |
| 3,218,861 | 11/1965 | Moore et al. | 73—371 |

FOREIGN PATENTS

| 010,816 | 8/1886 | Great Britain | 73—371 |
| 016,549 | 8/1905 | Great Britain | 73—371 |

LOUIS R. PRINCE, Primary Examiner

D. M. YASICH, Assistant Examiner